April 4, 1944.  L. N. BOOSEY  2,345,787

FLOW CONTROL TEE

Filed Dec. 22, 1941

INVENTOR.
Lawrence N. Boosey
BY
ATTORNEY

Patented Apr. 4, 1944

2,345,787

UNITED STATES PATENT OFFICE 2,345,787

FLOW CONTROL T

Lawrence N. Boosey, Detroit, Mich.

Application December 22, 1941, Serial No. 423,884

4 Claims. (Cl. 138—37)

This invention relates to a flow control T for use in the waste line of plumbing systems.

The feature and object of the invention is to provide a T in which liquid from a source containing waste matter as well as oil and greases is caused to rotate in passing from the inlet to the outlet of the T, an apertured wall being provided between the inlet and outlet shaped on the inlet side to provide a semispherical or cone like portion having an aperture in its bottom of less cross sectional area than the inlet or outlet, means being provided to permit air to enter the T beneath the opening in the said wall to relieve the liquid and material on the inlet side of the wall of at least a portion of the suction effect produced in the flow of liquid to the outlet.

The arrangement of parts productive of the desired result is shown in the accompanying drawing in which—

Figure 1:
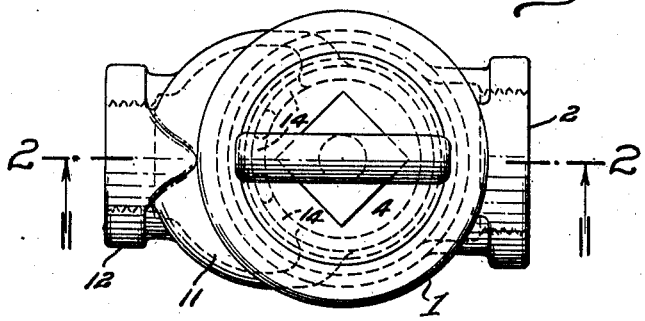
Fig. 1 is a plan view of my improved T.

In its preferred form the T consists of a hollow body 1 providing a chamber 1a having an inlet 2 on one side and an outlet chamber 3 on the bottom or at a right angle to the inlet. The top of the fitting has a threaded aperture to receive the sealing plug 4 having a handle portion 5 for introduction or removal of the same in the threaded opening 6 at the upper end of the T.

The chamber 1a of the fitting is semispherical in form at its bottom as indicated at 7 or may be cone shaped and the bottom wall 8 of the chamber 1a has an aperture 8a materially less in cross sectional area than the inlet 2. Beneath the wall 8 is a tubular portion 9 threaded as at 10 for connection with an outlet conduit 10a. At the side of the T opposite the inlet 2 is a chamber 11 which extends part way around the body of the T as indicated more clearly in Fig. 1. This chamber has an aperture 12 which may be connected with the conduit indicated at 13 in Fig. 3 open to atmosphere. The conduit 13 may or may not be used depending somewhat upon the character of installation. The chamber 11 is open to the outlet 3 by means of several apertures 14.

The conduit 10a leading from the outlet chamber 3 is approximately the same diameter as the inlet conduit as is the usual practice and in order to provide for delay in passage of the inlet liquid to the outlet the aperture 8a at the bottom of the chamber 1a is materially less in cross sectional area than either the inlet or outlet. In order to further effect the desired operation of the device, the outlet chamber 3 is open to atmosphere by the apertures 14, the combined area of which is approximately equal with the area of the opening 12 or conduit 13 connected therewith.

Figure 3:
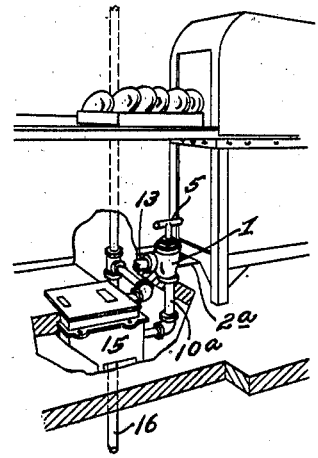
Fig. 3 shows the manner of installation of the T in a plumbing system between a dish washer and a grease separator.

Under this arrangement the suction imposed on the contents of the main chamber 1a is reduced but, by flow of liquid in the outlet conduit 10a the flow of liquid from the chamber 1a through the aperture 8a, the liquid in the chamber 1a will rotate. Thus any foreign matter, such as particles of food for instance, will be centered in the chamber 1a and tend to string out and pass through the aperture 8a to the outlet and thereby under usual conditions prevent clogging of the outlet 8a of the chamber 1a. In the event through some abnormal condition the outlet 8a becomes clogged, the retained material may be readily removed by hand upon removal of the sealing plug 4. The threaded air inlet aperture 12, or the conduit 13 opening thereto, is preferably less in cross sectional area than the cross sectional area of the inlet 2 or conduit 2a connected therewith as shown in Fig. 3. By this arrangement of parts and during discharge of liquid to the device there is a constant flow of liquid into the chamber 1a which is filled with liquid and the body of liquid thus tends to rotate and the central portion of the liquid body is discharged through the aperture 8a. It is by such character of flow that the foreign matter is centralized in the chamber 1a and thus tends to pass out of the said chamber through the aperture 8a.

It is this feature of the apparatus which distinguishes the invention from previously known plumbing fittings and in the suggested installation indicated in Fig. 3, wherein the discharge conduit connected with the tubular portion 9 discharges to a grease interceptor 15, the foreign matter may pass out through the outlet 16 of the interceptor. However in other structures the outlet conduit connected with the tubular portion 9 may lead directly to the sewer.

Figure 4:
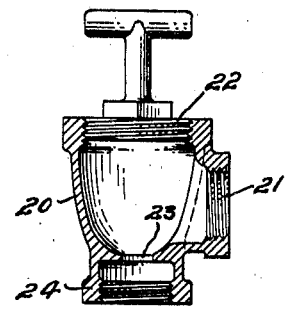
Fig. 4 is a vertical section of an alternative form of the device.

I have shown an alternative form of the structure in Fig. 4 which in many installations will serve adequately to produce rotation of the liquid body from the center of which liquid is discharged through the outlet. In said figure the chambered body is indicated at 20 having an inlet 21 at one side and a threaded opening in the top for the cleanout plug 22. The interior of the body is in the form of an ellipse, as is the case with the structure shown in Fig. 2, and an opening 23 is provided in the bottom providing for discharge of liquid to a conduit connected with the threaded hub 24. By this arrangement and, due to the aperture 23 being considerably less in cross sectional area than that of the inlet, the body of liquid within the elliptical chamber is caused to rotate and thus align any included waste material on the axis passing centrally through the body and outlet and to discharge through the opening 23 to the outlet connected with the hub 24.

Figure 2:
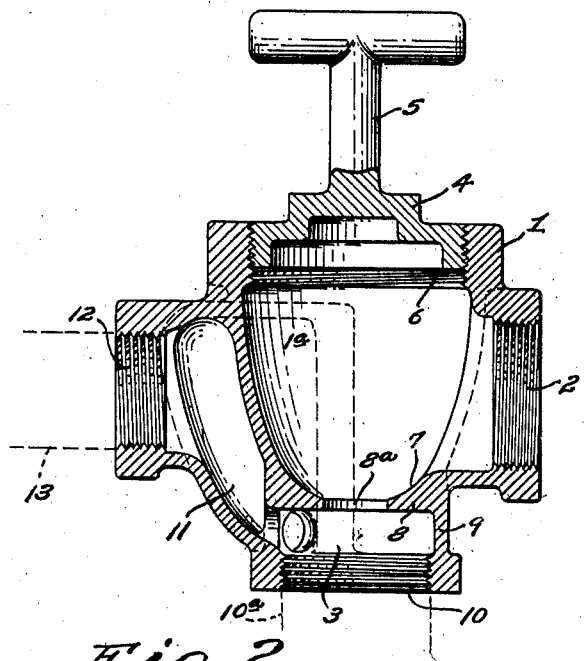
Fig. 2 is a vertical section taken on line 2—2 of Fig. 1.

In either of the structures shown any waste material that may be larger than would normally pass through the opening 23 is continually caused to rotate and to wear away through contact with the interior surface of the body and to finally pass through the aperture 23 of Fig. 4 or 8a of Fig. 2 to the outlet.

The device shown in Fig. 4 is particularly useful in structures wherein the suction effect of discharging liquid in the outlet conduit is not excessive and where the suction effect is so great as to produce too great a pull on the liquid in the interior of the body, the structure shown in Fig. 2 is considered to be more serviceable.

Having thus fully described my invention, its utility and mode of operation, what I claim and desire to secure by Letters Patent of the United States is:

1. A flow control T for installation in the outlet conduit of a plumbing system comprising a hollow body providing a chamber having an ovate bottom, said bottom having a central aperture, an inlet for liquid containing solids opening to one side of the body, said inlet being greater in cross sectional area than that of the said aperture, a hub to which the aperture opens, said hub having an aperture adjacent said ovate bottom in communication with atmosphere, and removable means at the larger end of the body providing access to the chamber.

2. A flow control T for installation in the outlet conduit of a plumbing system comprising a hollow body having an opening at its upper end and providing a chamber having the form of a half ellipse, the small end being at the bottom and having an opening providing an outlet, there being an inlet opening to one side of the body, said inlet opening being greater in cross sectional area than that of said outlet, a hub to which the outlet opens, a conduit open at one end to atmosphere and at the other end to the hub providing a means tending to reduce the suction effect imposed on the liquid within the hollow body by the discharging liquid and removable means for sealing the larger upper end of the body.

3. A flow control T for installation in the outlet conduit of a plumbing system comprising a hollow body providing a chamber having an ovate bottom and being open at the upper end, said bottom having a central aperture providing an outlet, said body also having an inlet opening to one side thereof, said inlet being greater in cross sectional area than the said outlet, a hub to which the said outlet opens, and means providing a passageway open at one end to atmosphere and at the other end to the hub.

4. A flow control system for liquids carrying immiscible matter in suspension therein which comprises: a chamber in the line of flow having an influent port and an effluent port; a pressure-difference member arranged within said chamber between said ports for restricting the flow therebetween, and a pressure-regulator device connected to the system upon the low-pressure side of said pressure-difference member comprising an inlet passageway communicating with the atmosphere exteriorly of said system.

LAWRENCE N. BOOSEY.